United States Patent [19]
Noguchi

[11] Patent Number: 5,280,885
[45] Date of Patent: Jan. 25, 1994

[54] VIBRATION ISOLATING APPARATUS
[75] Inventor: Takeshi Noguchi, Yokohama, Japan
[73] Assignee: Bridgestone Corporation, Tokyo, Japan
[21] Appl. No.: 821,852
[22] Filed: Jan. 14, 1992

Related U.S. Application Data
[63] Continuation of Ser. No. 590,055, Sep. 28, 1990, abandoned, which is a continuation of Ser. No. 328,331, Mar. 24, 1989, abandoned.

[30] Foreign Application Priority Data
Apr. 7, 1988 [JP] Japan ................... 63-85726

[51] Int. Cl.$^5$ ............................................. F16F 13/00
[52] U.S. Cl. .................. 267/140.12; 180/312; 248/562; 248/636; 267/219
[58] Field of Search ............. 267/219, 220, 140.12; 280/300, 312, 902; 248/562, 636, 638

[56] References Cited
U.S. PATENT DOCUMENTS

| | | |
|---|---|---|
| 4,535,976 | 8/1985 | Dan et al. |
| 4,588,174 | 5/1986 | Konishi |
| 4,605,207 | 8/1986 | Konishi |
| 4,630,806 | 12/1986 | Dan et al. |
| 4,717,111 | 1/1988 | Saito ................... 267/140.1 C X |
| 4,728,086 | 3/1988 | Ishiyama et al. |
| 4,749,174 | 6/1988 | Kanda ................... 180/312 X |
| 4,787,609 | 11/1988 | Dan et al. |
| 4,790,520 | 12/1988 | Tanaka et al. ................... 248/562 X |
| 4,871,152 | 10/1989 | Funahashi ................... 267/140.1 C |
| 4,893,798 | 1/1990 | Hibi et al. ................... 248/562 X |

FOREIGN PATENT DOCUMENTS

| | | |
|---|---|---|
| 3617787 | 11/1986 | Fed. Rep. of Germany . |
| 3721445 | 1/1988 | Fed. Rep. of Germany ...... 267/219 |
| 3722079 | 1/1988 | Fed. Rep. of Germany ...... 267/219 |
| 60-179542 | 9/1985 | Japan . |
| 60-184740 | 9/1985 | Japan . |
| 61-45131 | 3/1986 | Japan . |
| 206838 | 9/1986 | Japan ................... 267/219 |
| 184249 | 8/1987 | Japan ................... 267/140.1 C |
| 63-6248 | 1/1988 | Japan . |
| 2192968 | 1/1988 | United Kingdom ................... 267/219 |

Primary Examiner—George E. A. Halvosa
Attorney, Agent, or Firm—Oliff & Berridge

[57] ABSTRACT

A vibration isolating apparatus is disclosed which comprises an inner tube and an outer tube disposed in a parallel axis state to each other and an elastic member stretched therebetween, the elastic member being provided with a pair of liquid chambers disposed in the interior thereof at opposite sides through the inner tube. These liquid chambers communicate with each other through a restricted passage. The elastic member is provided with a pair of cavities on opposite outer sides of the inner tube. The cavities absorb relative displacement between the inner tube and the outer tube. When an amount of absorption becomes a predetermined amount, a compressing force is applied to the liquid chambers.

31 Claims, 14 Drawing Sheets

VIBRATION ISOLATING APPARATUS

This is a Continuation of application Ser. No. 07/590,555 filed Sep. 28, 1990, now abandoned, which in turn is a Continuation of application Ser. No. 07/328,331 filed Mar. 24, 1989 also now abandoned.

DETAILED DESCRIPTION OF THE INVENTION

1. Industrial Field of Utilization

The present invention relates to a so-called bush type vibration isolating apparatus in which an elastic member is stretched between an inner tube and an outer tube.

2. Background Art

An arrangement of an elastic member stretched between inner and outer tubes has been employed as a vibration isolating apparatus used for an engine mount, a carburetor mount, a bush and the like of an automobile. The elastic member is provided with a pair of liquid chambers disposed therein and communicating with each other through a restricted passage, and thus when vibration is generated, it is absorbed by a passing resistance caused when liquid in one of the liquid chambers passes to the other liquid chamber through the restricted passage.

In this vibration isolating apparatus, the pair of liquid chambers disposed on opposite outer sides of the inner tube can effectively vary liquid pressure in the liquid chambers when vibration is generated. However, the arrangement has a drawback in that when the inner and outer tubes moves relatively, the elastic member interposed between the liquid chambers and the inner tube is greatly distorted, which prevents the elastic member from having long durability.

Taking the above into consideration, an object of the present invention is to provide a bush type vibration isolating apparatus provided with respective liquid chambers disposed at opposite outer sides of an inner tube, an elastic member thereof being less distorted when the inner tube and outer tube are moved relatively in order to improve durability.

3. Summary and Operation of the Invention

A vibration isolating apparatus according to the present invention is characterized in that an elastic member is stretched between an inner tube and an outer tube which are connected to a vibrating portion and a vibration receiving portion, respectively. A pair of liquid chambers are disposed at opposite outer sides of the inner tube and are communicated through a restricted passage. Displacement absorbing portions are formed at opposite outer sides of the above inner tube, and one of the above liquid chambers is subject to a relatively moving force until the displacement absorbing portions disposed at opposite outer sides of the inner tube absorb the displacement of a predetermined stroke by the relative movement between the inner tube and the outer tube.

Therefore, in the present invention, even if the inner tube and the outer tube are displaced largely and relatively, a compressing force is not applied to one of the liquid chambers substantially until the displacement absorbing portions absorb the displacement of the predetermined stroke, that is, substantially until cavities as an example of the displacement absorbing portions come in close contact so that the elastic member is less distorted. As a result, when one of the inner and outer tubes is fixed to an engine and the other is fixed to an automobile body, the cavities are made to have close contact by the engine weight applied between the inner and outer tubes, whereby durability of the elastic member forming the side walls of the liquid chambers is improved. In the present invention, a little of the liquid can flow between the above liquid chambers until one of the cavities is deformed and comes into close contact Substantial amount of the liquid flows between the above liquid chambers to absorb the vibration after one of the cavities is deformed and comes into close contact. In addition, the present invention is applicable to provide a damping effect when a large amplitude of an engine and an automobile body are caused, such as a roll stopper.

EMBODIMENTS OF THE INVENTION

Figure 1:
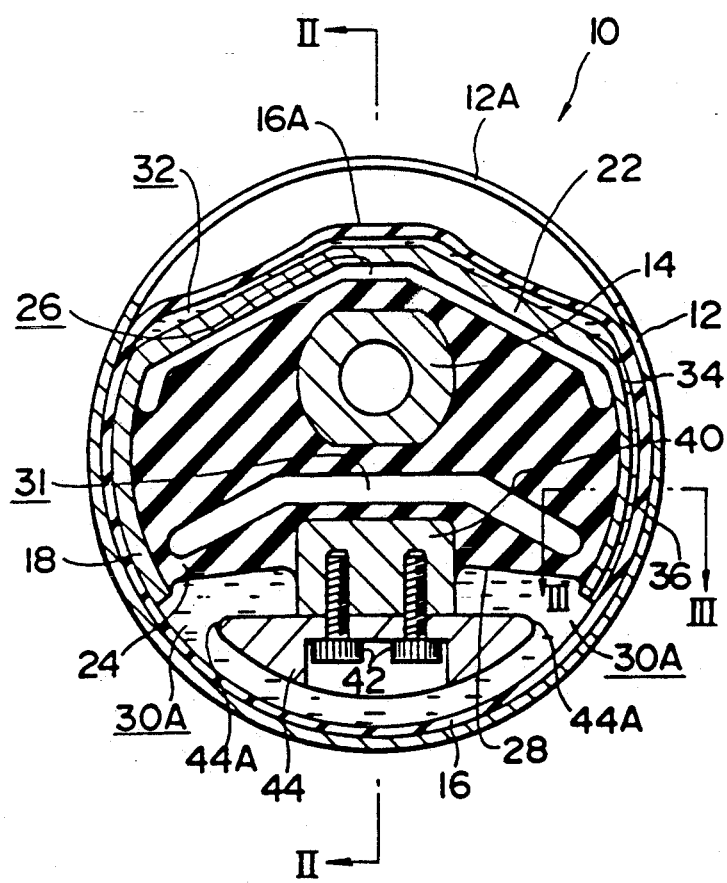
FIG. 1 is a cross-sectional view of a vibration isolating apparatus of a first embodiment according to the present invention and corresponding to a cross-sectional view taken along line I—I of FIG. 2.
Figure 2:
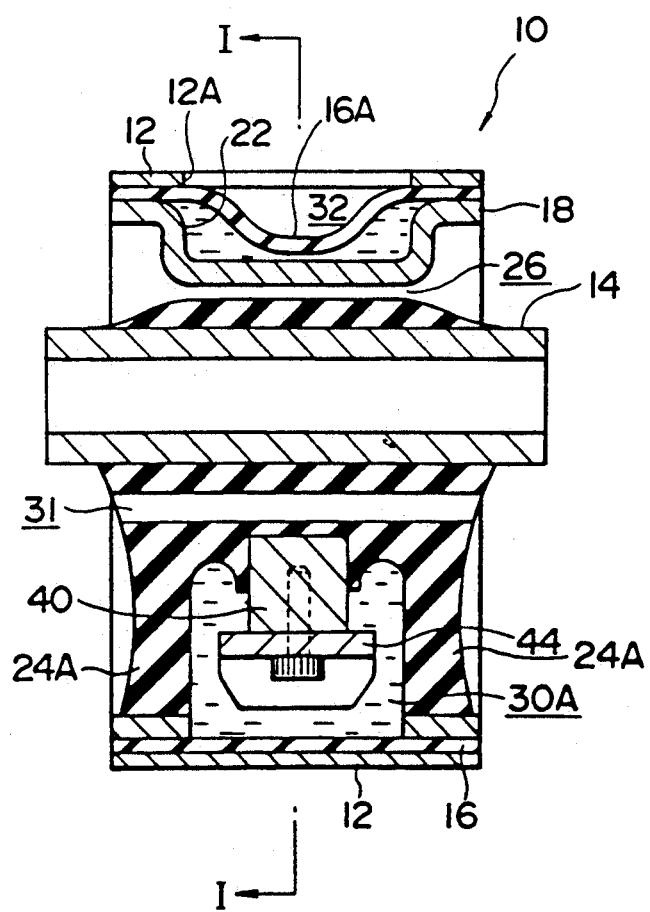
FIG. 2 is a cross-sectional view taken along line II—II of FIG. 1.

FIGS. 1 and 2 show a vibration isolating apparatus 10 relating to a first embodiment according to the present invention. This vibration isolating apparatus 10 is provided with an outer tube 12 and an innner tube 14 disposed in a parallel axis state, one of them being connected to an automobile body and the other being connected to an engine.

Figure 4:
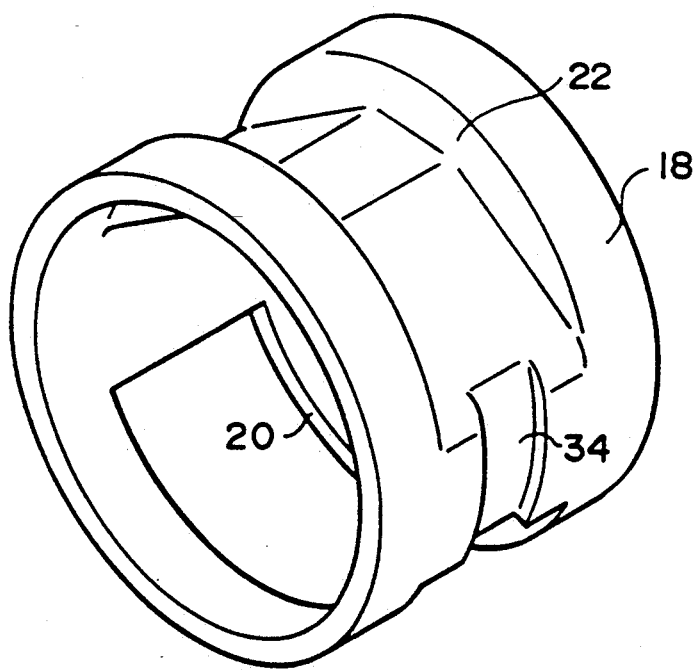
FIG. 4 is a perspective view of an intermediate tube in a first embodiment.

The outer tube 12 has an inside provided with an intermediate tube 18 disposed through a tubular elastic film 16. This intermediate tube 18 is of a configuration of a thin wall thickness as shown in FIG. 4, a rectangular cutout 20 being defined at a portion of the circumference thereof and a recess 22 serving as a partition being defined in an inner diameter reducing direction at a circumference opposite to the above circumference.

Therefore, when the intermediate tube 18 is disposed in the inside of the outer tube 12 through the elastic film 16, the elastic film 16 is held between the outer tube 12 and the inner tube 14 excluding the cutout 20 and the recess 22. The held portion of the elastic member 16 is preferably cured and bonded in the outer tube 12 or the intermediate tube 18.

An elastic member 24 is stretched between the inner tube 14 and the intermediate tube 18. A passing-through cutout 26 is formed as a cavity between the elastic member 24 and the recess 22, and a cutout 28 is also formed from the outer periphery of the elastic member 24 at an opposite side of the passing-side of cutout 26 through the inner tube 14 so that a liquid chamber 30 is defined which is filled with water, oil, ethylene glycol or the like. The liquid chamber has an outer circumference isolated by the elastic film 16.

The elastic member 24 is provided with a passing-through cavity-like cutout 31 having substantially the same shape as that of the passing-through cutout 26 defined between the liquid chamber 30 and the inner tube 14. As a result, when the inner tube 14 moves relatively with respect to the outer tube 12, in a downward direction when viewed in FIG. 1, this passing-through cutout 31 is deformably brought into close contact, and then the liquid chamber 30 is subject to a compressing force thereby causing a large compressing force to be applied to a side wall 24A of the liquid chamber 30.

Further, a portion of the elastic film 16 between the recess 22 of the intermediate tube 18 and the inner circumference of the outer tube 12 is made into a diaphragm 16A which is disposed apart from the outer tube 12 in a free state. As shown in FIG. 2, this diaphragm 16A has opposite ends in an axial direction held between the intermediate tube 18 and the outer tube 12 and a portion between the elastic film 16 and the recess 22 makes for a sealed liquid chamber 32.

Figure 3:
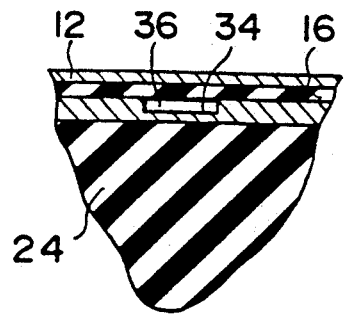
FIG. 3 is a cross-sectional view of a restricted passage taken along line III—III of FIG. 1.

The liquid chamber 30 communicates with the liquid chamber 32 through a bottomed groove 34 defined around the outer circumference of the intermediate tube 18. Thus, this bottomed groove 34 forms a restricted passage 36 between itself and the elastic film 16 in an assembly state shown in FIG. 3.

The elastic member 24 facing the liquid chamber 30 includes a mounting block 40 buried in the vicinity of the passing-through cutout 31 and the central portion of a stopper 44 is fixed accordingly by mounting bolts 42. Although the stopper 44 is preferably made of a hard metal material such as iron or the like, the outside thereof may be covered with an elastic member or it may be made of a hard elastic member to ease shocks caused when it is brought into contact with an inner circumference of the liquid chamber 30. In addition, a portion of the stopper 44 has a configuration along the inner circumference of the liquid chamber 30 so that it is held in abutment against the inner circumference of the liquid chamber 30 when moved downwardly as viewed in FIG. 1. In addition, tip portions 44A having an enlarged diameter at opposite sides form a narrow portion 30A between the inner circumference of the liquid chamber 30 and themselves. The narrow portion 30A produces liquid column resonance when high-frequency vibration is generated in order to maintain a low dynamic spring state.

Further, the outer tube 12 has a cutout 12A defined at a portion thereof corresponding to the diaphragm 16A to enable the diaphragm 16A to be deformed easily.

However, this diaphragm 16A may confront the inside of the outer tube 12 without providing the cutout 12A.

Next, operation of the present embodiment will be described.

For example, the inner tube 14 is connected to an engine of an automobile and the outer tube 12 is connected to an automobile body to support them. When the weight of the engine is applied to the inner tube 14, the passing-through cutout 31 is deformably brought into close contact. The close contact is not limited to a case wherein it is made over the entire area of the passing-through cutout 31 but it may be partially made such as at a central portion corresponding to the portion between the inner tube 14 and the mounting block 40.

Vibration from the engine is not only absorbed by internal friction of the elastic member 24 but also absorbed by resistance caused when liquid pressure in the liquid chambers 30 and 32 varies and the liquid moves from one chamber into another chamber through the restricted passage 36. In this case, when pressure in the liquid chamber 32 increases, the diaphragm 16A is elastically deformed to enable the liquid chamber 32 to be enlarged.

The large amplitude of vibration causes a portion of the elastic member 24 disposed around the inner tube 14 to be held in abutment against the recess 22 thereby restricting an amount of relative movement of the outer tube 12 and the inner tube 14. However, since the elastic member 24 is not held in abutment against the diaphragm 16A in the relative movement, durability of the diaphragm 16A is not damaged.

In addition, since the side wall 24A of the liquid chamber 30 has very small stress as compared with a case wherein the passing-through cutout 31 is not provided, the durability is improved.

Further, as long as a sealed state is maintained between the intermediate tube 18 and the outer tube 12, the portion of the elastic film 16 excluding the diaphragm 16A may be omitted.

When high-frequency vibration is generated, the restricted passage 36 is blocked. However, a low dynamic state is maintained because the stopper 44 stirs the liquid above and blows it between the tip portions 44A at the opposite sides and the inner circumference of the liquid chamber 30 through the narrow portion and produces liquid column resonance. A width of the stopper (size in a right and left direction in FIG. 1) is preferably larger than a width of the mounting block 40.

Figure 5:
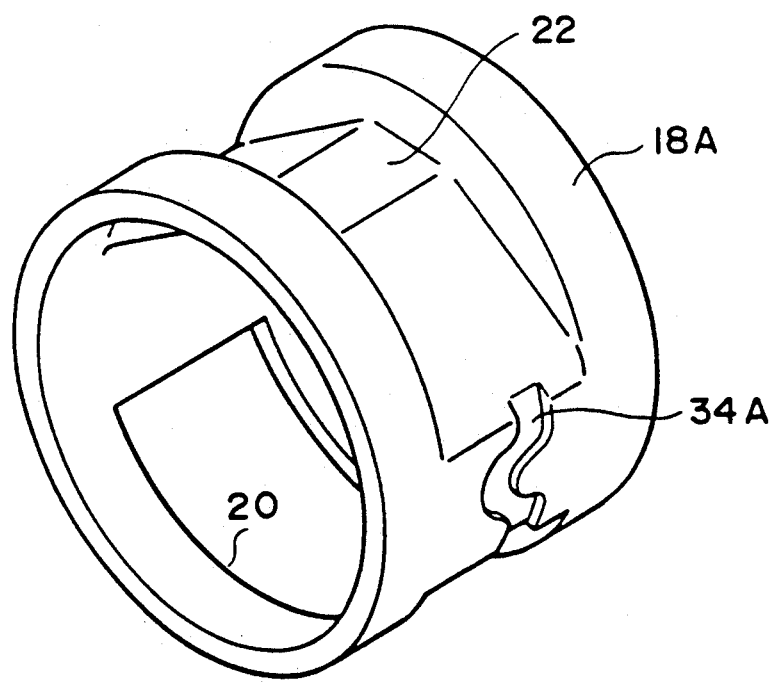
FIG. 5 is a perspective view of an intermediate tube used in a second embodiment.

Next, FIG. 5 shows an intermediate tube 18A used in a second embodiment. This intermediate tube 18A has a bottomed groove 34A formed therein which is different from the above embodiment and has a longitudinal axis bent in a substantially U-shape in order to provide a restricted passage for communicating with a pair of liquid chambers, the passage having a bent long axial line. With this arrangement, a large damping effect can be obtained.

Figure 6:
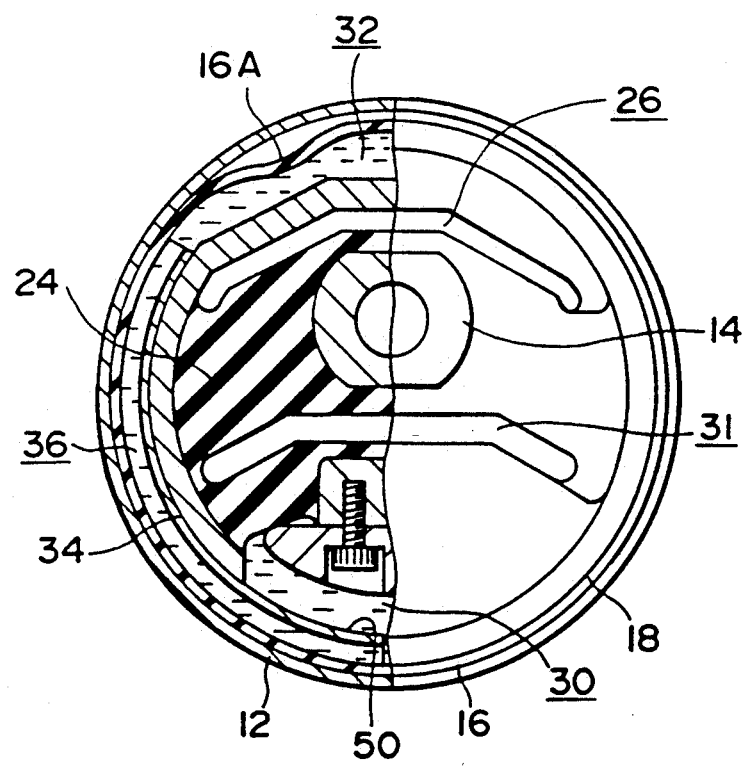
FIG. 6 is a fragmentary cross-sectional view of a third embodiment according to the present invention.

Next, FIG. 6 shows a vibration isolating apparatus relating to a third embodiment according to the present invention. In this embodiment, the vibration isolating apparatus has a bottomed groove 34 with an extended fitting 50 inserted therein, the fitting 50 having a C-shaped cross section and a part of the fitting 50 enters the liquid chambers 30. This extended fitting 50 has an outer circumference thereof as an opened portion which is in close contact with the inner circumference of the elastic film 16 forming a part of the restricting passage 36 in order to define the restricting passage 36 between the elastic film 16 and the fitting 50. With this arrangement, the axial line of the extended fitting 50 can be made longer than the bottomed groove 34 so as to provide an effect that the restricted passage 36 is substantially extended.

Figure 8:
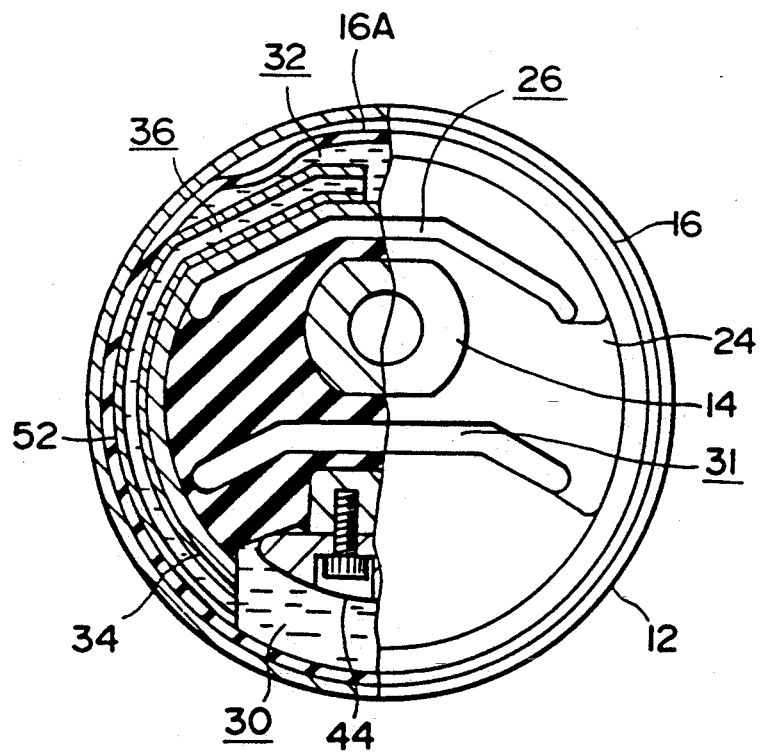
FIG. 8 is a fragmentary cross-sectional view of a fourth embodiment according to the present invention.
Figure 9:
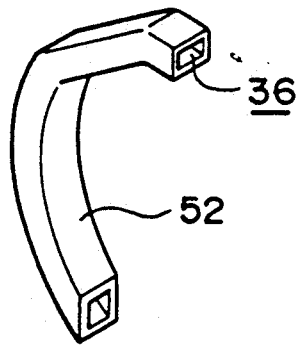
FIG. 9 is a perspective view of an extended fitting used in a fourth embodiment.

Next, FIGS. 8 and 9 show a fourth embodiment according to the present invention. This embodiment uses an extended fitting 52 instead of the extended fitting 50 used by the third embodiment. This extended fitting 52 is shaped so as to have a cross section of a rectangular frame shape when it is cut perpendicularly to the axis thereof and the restricting passage 36 is defined therein. Therefore, this embodiment makes the axial size of the extended fitting 52 longer than the axial size of the bottomed groove 34 in order to provide the restricted passage 36, having a substantially longer axial size, to improve a damping effect.

Figure 10:
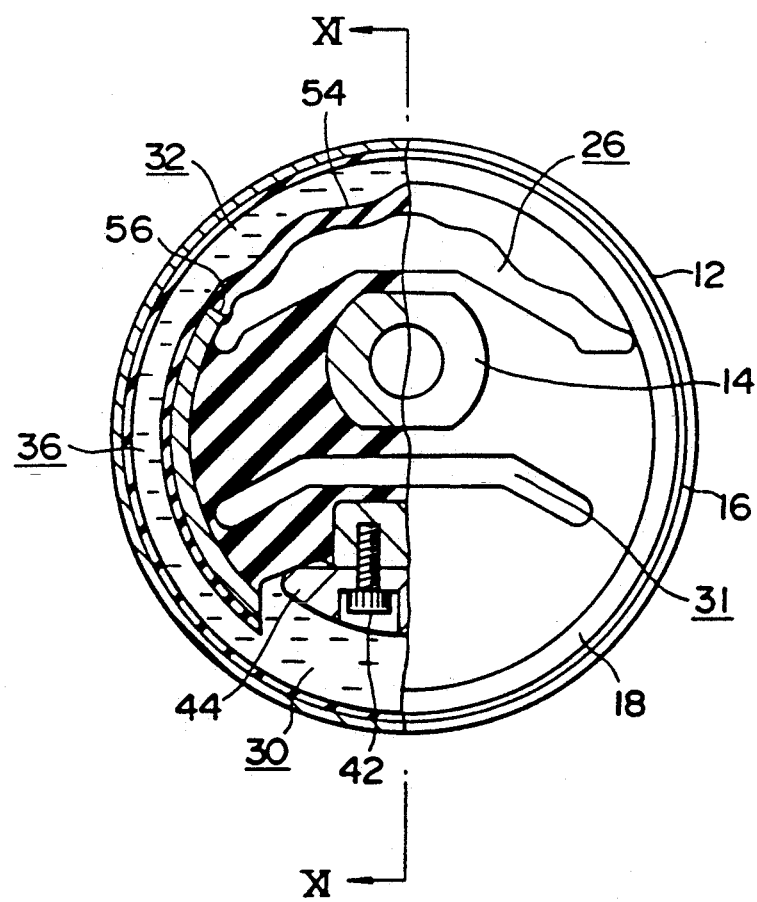
FIG. 10 is a fragmentary cross-sectional view of a fifth embodiment according to the present invention.
Figure 11:
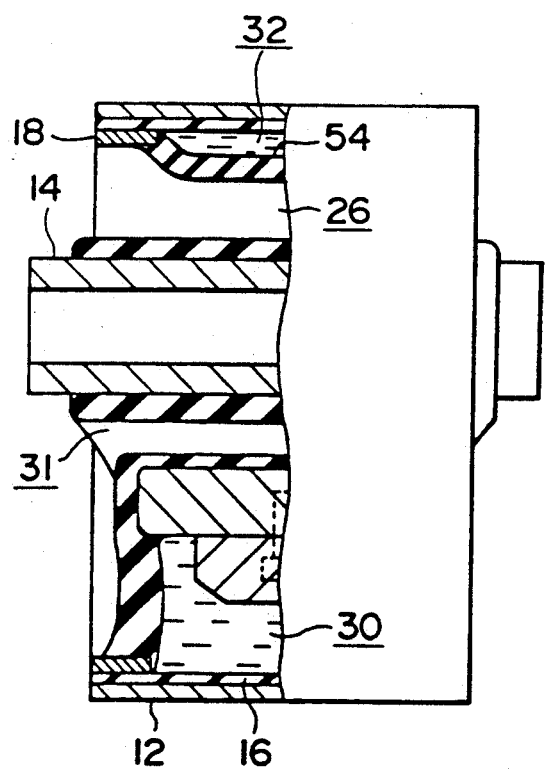
FIG. 11 is a fragmentary cross-sectional view illustrative of a cross sectional view taken along line XI—XI of FIG. 10.

Next, FIGS. 10 and 11 show a fifth embodiment according to the present invention. This embodiment has a cutout 56 defined by cutting the recess 22 formed in the intermediate tube 18 of an above first embodiment and the elastic film 54 is fixed thereto. This elastic film 54 forms the inner circumference of the liquid chamber 32, and the inner circumference of the outer tube 12 (the cutout 12A is not defined different from the first embodiment) forms the outer circumference of the liquid chamber 32. With this arrangement, this embodiment is provided with a liquid chamber 32 formed between the elastic film 54 and the outer tube 12. The other arrangement of this embodiment is the same as that of the first embodiment in order to provide the same effect.

Figure 12:
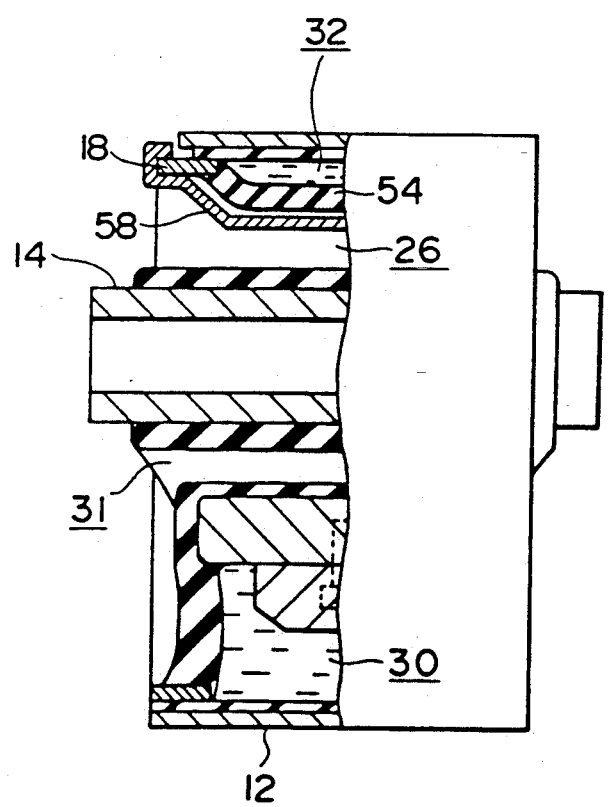
FIG. 12 is a fragmentary cross-sectional view of a sixth embodiment according to the present invention.

Next, FIG. 12 shows a sixth embodiment according to the present invention. This embodiment has a protection metal plate 58 interposed between the elastic film 54 and the inner tube 14 of the fifth embodiment and the opposite sides are caulked to the intermediate tube 18 and fixed thereto (they may be fixed to the outer cylinder 12). With this arrangement, even if the inner and outer tubes displace largely and relatively, the inner tube 14 is not held in abutment against the elastic film 54.

Figure 13:
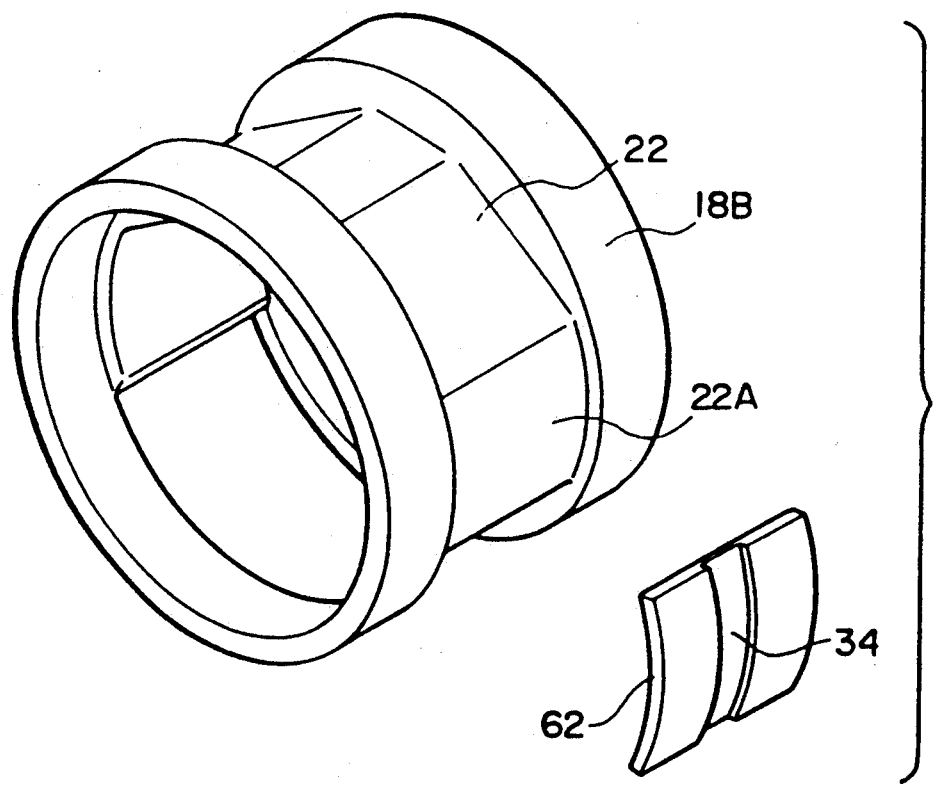
FIG. 13 is a perspective view corresponding to FIG. 4 illustrative of an intermediate tube used in a seventh embodiment according to the present invention.

Next, FIG. 13 shows an intermediate tube 18B used in a seventh embodiment according to the present invention. This intermediate tube 18B has a recess 22A continuous to the recess 22 formed by stamping. An elastic member 62 such as rubber or the like is fixed to the recess 22A and the outer circumference of the elastic member 62 is in close contact with the inner circumference of the outer tube 12 or the elastic film 16. The elastic member 62 has the bottomed groove 34 defined therein for communicating the pair of liquid chambers. This bottomed groove 34 can be formed simultaneously when the elastic member 62 is cured and formed into the recess 22A.

Therefore, this intermediate tube 18B is made more easily as compared with the intermediate tube 18 of FIG. 4 because it is not required to define the bottomed groove 34 by machining.

Figure 14:
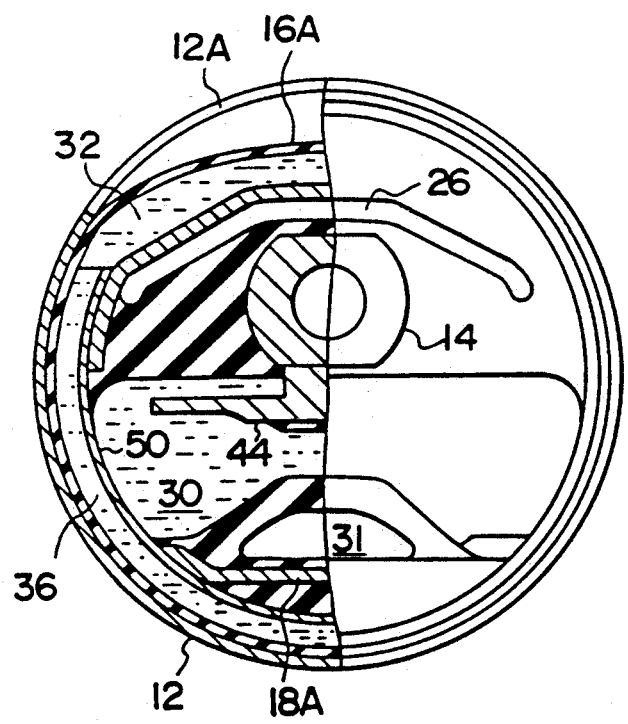
FIG. 14 is a fragmentary cross-sectional view of a eighth embodiment according to the present invention.
Figure 15:
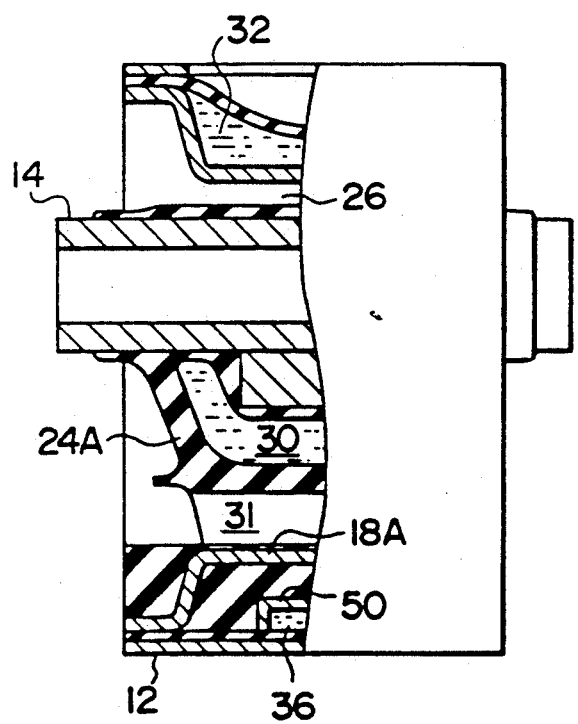
FIG. 15 is a fragmentary cross-sectional view illustrative of a cross sectional view of FIG. 14.

Next, FIGS. 14 and 15 show an eighth embodiment according to the present invention.

Figure 7:
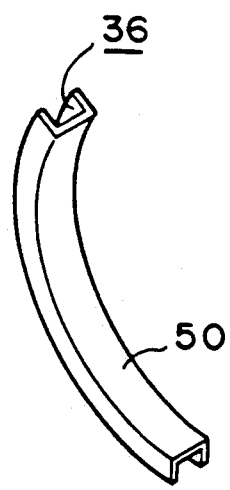
FIG. 7 is a perspective view of an extended fitting used in a third embodiment.

In this embodiment, the restricted passage 36 is defined by the extended fitting 50 with a C-shaped cross section as the third embodiment in FIGS. 6 and 7 for communicating the liquid chambers 30 and 32. Further, the extended fitting 50 of this embodiment is made longer as compared with the case in FIG. 6, that is, it is half of the circumference of a circle around the inner tube 14. A portion of the extended fitting 50 which communicates with the liquid chamber 30 is disposed in the cutout portion 20 of the intermediate (see FIG. 5), and its opposite ends are integrally connected to the intermediate tube 18. The extended fitting 50 passes between the bent plate 18A which is bent in a direction in which an intermediate portion approaches the inner tube 14 and the outer tube 12.

Further, in this embodiment and different from the above respective embodiments, the elastic member 24 is formed with the passing-through cutout 31 between the liquid chamber 30 and the bent plate 18A. More specifically, the passing-through cutout 31 of this embodiment is not disposed between the liquid chamber 30 and the inner tube 14 but between the liquid chamber 30 and the outer tube 12. When the inner tube 14 is subject to a load in a downward direction in the figure with respect to the outer tube 12, the passing-through cutout 31 is deformably brought into close contact. Then a compressing force is applied to the liquid chamber 30, whereby the same effect as the above respective embodiments can be obtained.

What is claimed is:

1. A vibration isolating apparatus interposed between a vibration generating portion and a vibration receiving portion for absorbing vibration by liquid passing resistance, comprising:
   (a) an inner tube connected to one of the vibration generating portion and the vibration receiving portion;
   (b) an outer tube connected to the other of the vibration generating portion and the vibration receiving portion and disposed in a parallel axis state with the inner tube;
   (c) an elastic member stretched between said inner and outer tubes;
   (d) an elastic film formed adjacent an inner wall of the outer tube;
   (e) a pair of liquid chambers disposed between said elastic member and the inner circumference of said outer tube at opposite sides of the inner tube from each other, and filled with liquid, said elastic film dividing one of said liquid chambers from an empty portion void of the liquid, such that said empty portion void of the liquid is provided outside of said one of said liquid chambers and inside of said outer tube;
   (f) a restricted passage communicating said liquid chambers with each other for enabling the liquid to pass between both the liquid chambers;
   (g) displacement absorbing portions disposed, respectively, on opposite outer sides of said inner tube, for preventing substantial compression of the liquid chambers during large relative displacement of the inner tube and outer tube, such that a compressing force is applied to the liquid chambers substantially only after the displacement absorbing means have absorbed a predetermined amount of relative displacement; and
   (h) an intermediate tube fixed to the inside of said outer tube, said elastic member being fixed to said outer tube through said intermediate tube, said one of said liquid chambers being located entirely between said elastic film and said intermediate tube.
   wherein said displacement absorbing portions are a pair of cavities, one cavity formed within the elastic member and another cavity formed between said elastic member and said intermediate tube with each cavity disposed respectively between one of the liquid chambers and the inner tube.

2. The vibration isolating apparatus according to claim 1, wherein at least one of said cavities pass through said elastic member along the axial direction of the inner tube or the outer tube.

3. The vibration isolating apparatus according to claim 1, wherein one of said displacement absorbing portions is between the liquid chamber disposed outwardly from the intermediate tube and the inner tube, and is further defined between the intermediate tube and the inner tube.

4. The vibration isolating apparatus according to claim 3, wherein said one of said displacement absorbing portions is a cavity defined between the intermediate tube and the elastic member.

5. The vibration isolating apparatus according to claim 4, wherein said cavity enables opposite sides in the axial direction of the intermediate tube to communicate.

6. The vibration isolating apparatus according to claim 5, wherein said cavity has a long and narrow shape with its axis at an intermediate portion thereof disposed near the inner tube and, said cavity, at opposite ends thereof, being disposed near the outer tube when viewed perpendicularly to the axial direction of the inner tube.

7. The vibration isolating apparatus according to claim 6, wherein a pair of the cavities at opposite outer sides of said inner tube are disposed with axes at intermediate portions thereof substantially in parallel to each other and the axial direction of the inner tube.

8. The vibration isolating apparatus according to claim 5, wherein a part of said intermediate tube is bent toward the inner tube and said cavity is defined between a bent portion and the inner tube.

9. The vibration isolating apparatus according to claim 8, wherein one part of said elastic member is disposed at the inner circumference of said intermediate tube and another part of said elastic member is disposed at the outer circumference of said inner tube which confronts said cavity, and when the inner tube and the outer tube are displaced largely and relatively, the inner tube is held in abutment against the intermediate tube through the elastic member.

10. The vibration absorbing apparatus according to claim 1, wherein said restricted passage comprises at least one groove provided in said intermediate tube.

11. The vibration absorbing apparatus according to claim 1, wherein a longitudinal axis of said groove is bent to provide an improved damping effect.

12. The vibration absorbing apparatus according to claim 1, wherein said restricted passage comprises a passage in a fitting inserted in said passage.

13. The vibration absorbing apparatus according to claim 12, wherein said fitting is a "C" shape cross section fitting.

14. The vibration absorbing apparatus according to claim 13, wherein said fitting is longer than the length of said passage.

15. The vibration absorbing apparatus according to claim 12, wherein said fitting is a rectangular tube shape cross section.

16. The vibration absorbing apparatus according to claim 15, wherein said fitting is longer than the length of said passage.

17. The vibration absorbing apparatus according to claim 1, said elastic film being fixed to borders of an opening in said intermediate tube, said elastic film forming an outer wall of one of said liquid chambers.

18. The vibration absorbing apparatus according to claim 17, wherein a metal plate is interposed between said elastic film and said inner tube with its ends integrally attached to said intermediate tube so that said inner tube is prevented from contacting said elastic film.

19. The vibration absorbing apparatus according to claim 1, wherein one of said displacement absorbing portions is located between one of said liquid chambers and said outer tube.

20. The vibration absorbing apparatus according to claim 1, wherein a stopper is mounted on a mounting block inside one of said liquid chambers and forms a narrow liquid passage between itself and a wall of said liquid chamber, whereby low frequency damping is achieved by resonance of liquid chamber liquid in the narrow passage.

21. The vibration absorbing apparatus according to claim 20, wherein a width of the stopper is larger than a width of the mounting block.

22. A vibration isolating apparatus provided with an elastic member stretched between an inner tube and an outer tube connected to a vibrating portion and a vibration absorbing portion, respectively, and a pair of liquid chambers disposed between said elastic member and the inner circumference of said outer tube at opposite sides of the inner tube from each other, the liquid chambers being communicated through a restricted passage, and an elastic film fixed adjacent an inner wall of said outer tube, and an intermediate tube fixed to the inner wall of said outer tube through said elastic film, said elastic member being fixed to said outer tube through said intermediate tube with one of said liquid chambers being partially filled, said elastic film dividing said partially filled chamber into a liquid-filled portion and an empty portion void of the liquid, said liquid-filled portion located entirely between said elastic film and said intermediate tube and cavities with walls defined at opposite outer sides of said inner tube, respectively characterized in that one of said liquid chambers is subject to a relatively moving force substantially after one of the cavities is deformed so that its walls come into close contact by the relative movement of the inner tube and the outer tube, wherein one of said cavities is formed within the elastic member and another of said cavities is formed between said elastic member and said intermediate tube, with each cavity disposed respectively between one of the liquid chambers and the inner tube.

23. The vibration isolating apparatus according to claim 22, wherein at least one of said cavities passes through said elastic member in the axial direction of the inner tube.

24. The vibration isolating apparatus according to claim 22, wherein said cavities enable the opposite sides in the axial direction of the intermediate tube to communicate.

25. The vibration isolating apparatus according to claim 24, wherein one of said cavities has a long and narrow shape with its axis at an intermediate portion thereof disposed nearer the inner tube and, said one cavity at opposite ends thereof, being disposed nearer the outer tube when viewed perpendicularly to the axial direction of the inner tube.

26. The vibration isolating apparatus according to claim 24, wherein a pair of the cavities at opposite outer sides of said inner tube are disposed substantially in parallel to each other and the axial direction of the inner tube.

27. The vibration isolation apparatus according to claim 22, wherein one of the cavities is between the liquid chamber disposed outwardly of the intermediate tube and the inner tube, the cavity further being defined between the intermediate tube and the inner tube.

28. The vibration isolating apparatus according to claim 22, wherein a part of said intermediate tube is bent toward the inner tube and said cavity is defined between the bent portion and the inner tube.

29. The vibration isolating apparatus according to claim 28, wherein a part of said elastic member is disposed at one of the inner circumference of said intermediate tube and the outer circumference of the inner tube which confronts said cavity, and when the inner tube and the outer tube are largely displaced relative to each other, the inner tube is held in abutment against the intermediate tube through the elastic member.

30. The vibration isolating apparatus according to claim 29, wherein at least one of said cavities pass through said elastic member along the axial direction of the inner tube or the outer tube.

31. A vibration isolating apparatus interposed between a vibration generating portion and a vibration receiving portion for absorbing vibration by liquid passing resistance, comprising:

(a) an inner tube connected to one of the vibration generating portion and the vibration receiving portion;

(b) an outer tube connected to the other of the vibration generating portion and the vibration receiving portion and disposed in a parallel axis state with the inner tube;

(c) an intermediate tube fixed to the inside of said outer tube;

(d) an elastic film fixed adjacent an inner wall of said outer tube;

(e) a pair of liquid chambers disposed between an elastic member and the inner circumference of said outer tube at opposite sides of the inner tube from each other, and filled with liquid such that one of said chambers is only partially filled, said one of said liquid cambers being divided by said elastic film into a liquid-filled portion and an empty portion void of the liquid, said liquid-filled portion located entirely between said elastic film and said intermediate tube;

(f) a restricted passage causing these liquid chambers to communicate with each other for enabling the liquid to pass between both the liquid chambers; and (g) said elastic member interposed between the inner circumference of said intermediate tube and the outer circumference of said inner tube for supporting a load applied between both tubes, the elastic member including a first cavity within the interior thereof and a second cavity provided between an outer surface of the elastic member and an inner surface of the intermediate tube, the cavities being disposed at opposite outer sides of the inner tube, whereby when the inner tube and the outer tube are displaced largely and relatively to each other, the displacement is absorbed to prevent the respective liquid chambers from being subjected to a compressing force and the compressing force is applied in the liquid chambers substantially after the displacement absorbing portions have absorbed the displacement of a predetermined stroke.

* * * * *